United States Patent
Gore

(10) Patent No.: US 12,191,537 B2
(45) Date of Patent: Jan. 7, 2025

(54) INTEGRATED ELECTRICAL AND THERMAL ENERGY STORAGE

(71) Applicant: Rolls-Royce North American Technologies, Inc., Indianapolis, IN (US)

(72) Inventor: Patrick Gore, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 341 days.

(21) Appl. No.: 17/358,597

(22) Filed: Jun. 25, 2021

(65) Prior Publication Data

US 2022/0416266 A1    Dec. 29, 2022

(51) Int. Cl.
*H01M 8/04029*    (2016.01)
*H01M 8/18*    (2006.01)

(52) U.S. Cl.
CPC ......... *H01M 8/04029* (2013.01); *H01M 8/18* (2013.01)

(58) Field of Classification Search
CPC ..... H01M 8/18; H01M 8/188; H01M 8/04029
See application file for complete search history.

(56) References Cited

U.S. PATENT DOCUMENTS

| | | | |
|---|---|---|---|
| 10,654,162 B2 | 5/2020 | Munevar et al. | |
| 2010/0092813 A1 | 4/2010 | Sahu | |
| 2012/0321920 A1 | 12/2012 | Perry et al. | |
| 2013/0011702 A1* | 1/2013 | Horne | B60L 53/52 |
| | | | 429/105 |
| 2015/0099206 A1 | 4/2015 | Horne et al. | |
| 2015/0111081 A1* | 4/2015 | Slotta | H01M 6/5038 |
| | | | 429/118 |
| 2015/0188178 A1 | 7/2015 | Knudsen et al. | |
| 2016/0226110 A1 | 8/2016 | Jin et al. | |
| 2017/0077572 A1 | 3/2017 | Parkinson | |
| 2018/0370013 A1* | 12/2018 | Munevar | H01M 10/613 |
| 2020/0411891 A1 | 12/2020 | D'Anzi et al. | |

OTHER PUBLICATIONS

Babu R. Chalamala et al., "Redox Flow Batteries: An Engineering Perspective", 2014, 24 pgs.
Sunny Maye, et al., "Thermally regenerative copper nanoslurry flow batteries for heat-to-power conversion with low-grade thermal energy", May 19, 2020, 9 pgs.

* cited by examiner

*Primary Examiner* — Brian R Ohara
*Assistant Examiner* — Brent C Thomas
(74) *Attorney, Agent, or Firm* — Barnes & Thornburg LLP

(57) ABSTRACT

A system includes a flow battery and a temperature control system. The flow battery is configured to thermally manage a thermal load. In some embodiments, the flow battery is also configured to electrically power the thermal load. The temperature control system is configured to cool electrolyte in the flow battery in response to the thermal load being inactive.

13 Claims, 5 Drawing Sheets

INTEGRATED ELECTRICAL AND THERMAL ENERGY STORAGE

TECHNICAL FIELD

This disclosure relates to thermal management, and in particular the use of flow batteries for both electrical power and thermally regulating thermal loads.

BACKGROUND

Thermal loads are typically connected to separate devices for electrical power and thermal management. The device providing electrical power is an electrical energy storage device such as a lithium ion battery, and the device providing thermal management is a thermal energy storage device such as a tank filled with high specific heat capacity fluid. Such configurations using separate devices are relatively large in size and heavy in weight. Ways to reduce the size and weight while still providing sufficient electrical power and thermal management are desirable.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
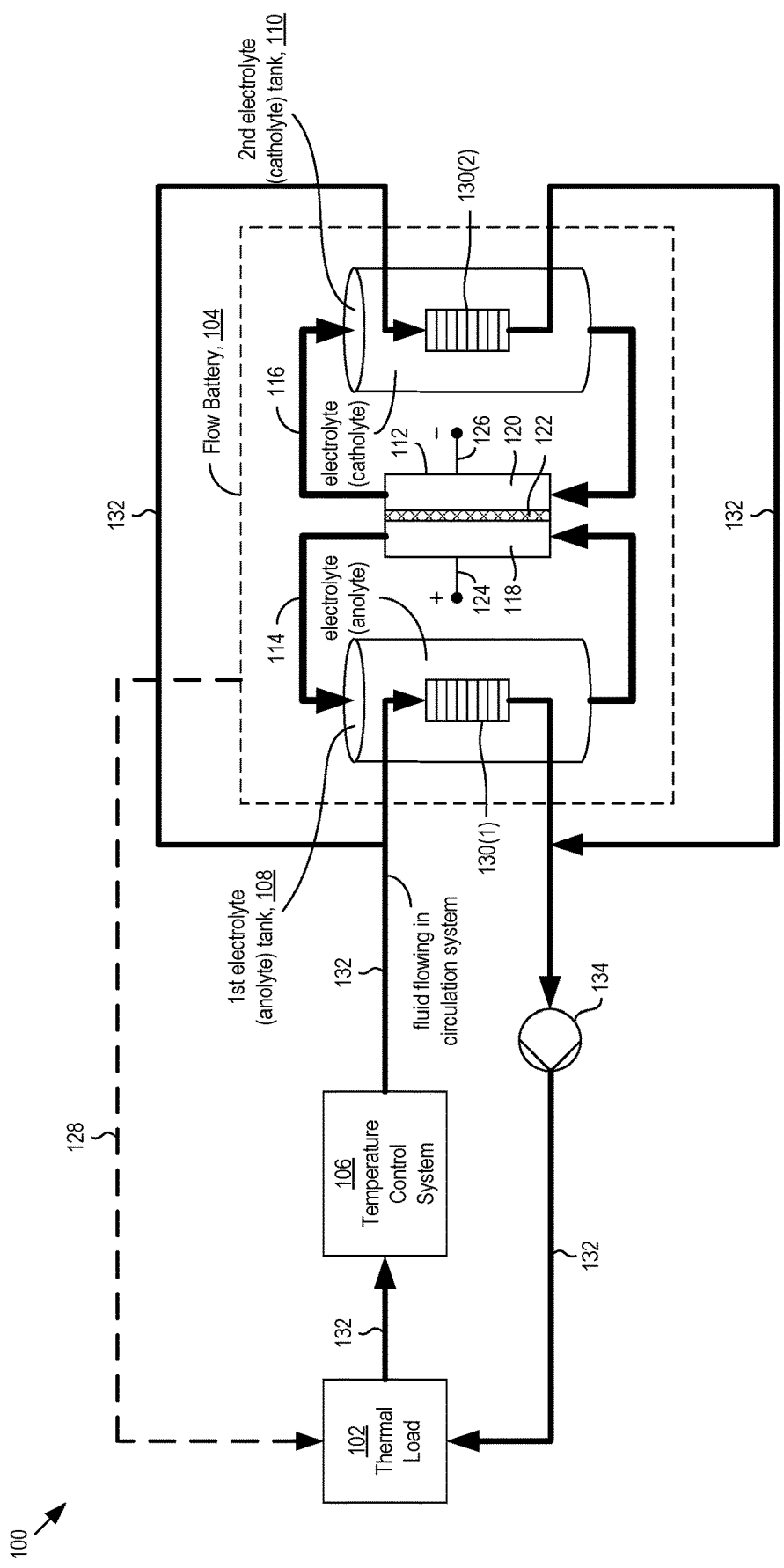
FIG. 1 shows a diagram of an example system configured to electrically power and thermally manage a thermal load.

The present description describes apparatuses, devices, systems, and methods for a flow battery configured to thermally manage and electrically power a thermal load. In one embodiment, a system includes a flow battery, and a temperature control system configured to cool an electrolyte of the flow battery in response to a thermal load being inactive. One interesting feature is that the functions of electrical energy storage and thermal storage are combined via a flow battery. Combining the functions may eliminate the need to use separate devices for the electrical energy storage and the thermal storage. This, in turn, may allow for smaller packaging, and/or configurations for thermal loads with reduced size and/or weight. Another interesting feature is that an electrolyte of the flow battery serves as the thermal energy storage medium. Another interesting feature is that the electrolyte cools a fluid or coolant used to regulate an operating temperature of a thermal load. An additional interesting feature is that using a flow battery for both electrical and thermal functions allows a system to leverage the ability of a flow battery to store electrolyte in tanks separate from the reactor, decoupling energy storage and power. Thus, power requirements drive the reactor sizing, and electrical energy (and thermal) energy storage requirements drive electrolyte volume, which may lead to optimized size, weight, and performance of both the electrical and thermal aspects of the system. In contrast, systems that separate the electrical and thermal management among separate devices may have oversized electrical energy storage based on the power requirements sizing the battery. Further, in flow batteries, because electrolytes are separated from the reactor, flow batteries have no loss of charge, unlike other batteries.

Another interesting feature is that a flow battery temperature is inherently well controlled through use of its electrolyte as a coolant. This, in turn, may enable use of a flow battery in ambient temperatures, which may otherwise not be able to operate. Additionally, use of a flow battery's electrolyte as a coolant enables simultaneous optimization of both the coolant system and the electrical system by allowing the system to add or remove heat at optimal locations in the system. For example, the systems may keep the electrolyte tanks cooled for thermal purposes while heating the electrolyte on its way to the reactor in order to optimize performance of the reactor. Further still, the flow battery may heat the coolant if or when desirable, such as upon startup. The flow battery may do this by purposefully inefficiently discharging, in various embodiments.

An additional interesting feature is that flow batteries have operational flexibility and maintainability in that a flow battery does not experience significant degradation in its battery capacity. Moreover, additional electrolyte tanks can be added to a flow battery, or existing electrolyte tanks can be replaced with new electrolyte tanks, as needed without much difficulty. Accordingly, removing any electrical hazards may be easily achieved by fully discharging the electrolyte. Also, flow batteries in the system may be less prone to exploding compared to other types of batteries.

Another interesting feature is that the flow batteries may be used to electrically and thermally manage generally any of various types of thermal loads, including but not limited to thermal loads in electric or hybrid vehicles (e.g., ground vehicles, trains, ships, aircraft), thermal loads in grid energy storage, and thermal loads that operate on an intermittent or pulsed basis, such as directed energy weapons or uninterruptible power supplies. With particular respect to electric and hybrid vehicle applications, use of flow batteries may significantly reduce recharge times compared to conventional batteries. Also, for aircraft, use of flow batteries may allow for more compact thermal and electrical systems since the electrolyte can be pre-cooled just before take-off or climb, which is the most arduous period for electrical and thermal systems due to both high load and high ambient temperatures. With particular respect to grid energy storage, flow batteries may provide thermal energy storage at negligible or insignificant cost, allowing the thermal energy storage to be used in a myriad of ways, such as for reducing building heating and cooling system demand, industry processes, or for generation of additional electricity via thermodynamic processes.

These and other interesting features are described in further detail below with respect to the drawings.

FIG. 1 shows a system 100 that is configured to thermally control and electrically power a thermal load 102. The system 100 may include a flow battery 104 and a temperature control system 106. In general, the flow battery 104 is configured to provide a fluid to the thermal load 102 to cool the thermal load, in turn regulating an operating temperature of the thermal load 102 and preventing the thermal load 102 from overheating or otherwise operating at a temperature higher than desired or intended. The flow battery 104 may also electrically power the thermal load 102, providing the flow battery 104 with combined functionality of thermally managing and electrically powering the thermal load 102. The temperature control system 106 is configured to control a temperature of the flow battery 104. The temperature control includes cooling the flow battery 104, including during periods of inactivity of the thermal load 106. Cooling the flow battery 104 may enhance the functionality of, and/or prolong the life of, the flow battery 104 as a thermal management device for the thermal load 102.

In general, the thermal load 102 may be any device, including any electronic device having electronic circuitry, that uses electrical power to operate and that has an operating temperature that is monitored, managed, controlled, and/or regulated to be at or below a target temperature or within a target operating temperature range. The device may consume electrical power to operate, and generate heat when consuming the electrical power, which may increase an operating temperature of the device. Thermal management may be used to offset the increased operating temperature to prevent the thermal load 102 from operating at too high of temperatures and/or from overheating.

In addition, the thermal load 102 may be configured to be active (or in an active mode) and inactive (or in an inactive mode). In general, the thermal load 102 consumes a greater amount of power, generates more heat, and/or operates at a higher temperature when active compared to when it is inactive. In some embodiments, the thermal load 102 is active when it is consuming electrical power (e.g., "turned on") and inactive when it is not consuming electrical power (e.g., "turned off"). In other embodiments, the active mode is a high-power mode and the inactive mode is a low-power mode. Also, an inactive mode of the thermal load 102 may be a mode that causes the temperature control system 106 to output a fluid at a temperature that is lower than a temperature of the flow battery 104, as described in further detail below.

In addition, the thermal load 102 may operate during active time periods and inactive time periods. During an active time period, the thermal load 102 is active or operating in the active mode, and during an inactive time period, the thermal load 102 is inactive or operating in the inactive mode. In various embodiments, the thermal load 102 alternates between active and inactive time periods. Additionally, in particular of these embodiments, the active time periods are shorter than the inactive time periods. Such active periods may be considered pulsed active periods, in that the thermal load 102 is active for short or pulsed periods, each followed by a long periods of inactivity. Non-limiting examples of thermal loads that operate in short, pulsed active periods followed by long, inactive periods included directed energy weapons (e.g., laser systems) and uninterruptible power supplies.

The flow battery 104 may be any energy storage device that is configured to generate a voltage from chemical energy provided by chemical components dissolved in liquids being circulated. The liquid, which contains ions, is referred to as an electrolyte fluid (or just electrolyte). The electrolyte may include two types, including an anolyte and a catholyte. The flow battery 104 may include a first electrolyte tank (also referred to as an anolyte tank) 108 that contains the anolyte, and a second electrolyte tank (also referred to as a catholyte tank) 110 that contains the catholyte. The flow battery 104 may also include a reactor 112 and circulation systems 114, 116 that circulate the anolyte and catholyte between their respective electrolyte tanks 108, 110 and respective portions 118, 120 of the reactor 112. The reactor 112 may include an ion-selective membrane 122 separating the reactor portions 118, 120 that permits an ion exchange between the anolyte and catholyte flowing through the reactor 120, which generates a voltage V across positive and negative terminals 124, 126. Hereafter, unless expressed otherwise, the term electrolyte is used to refer to the anolyte alone, the catholyte alone, or the anolyte and catholyte collectively.

For at least some embodiments, the flow battery 104 is electrically connected to, and configured to supply power to, the thermal load 102, based on the voltage V it generates across its terminal 124, 126. This electrical connection is denoted by dotted arrow 128 in FIG. 1. The thermal load 102 is configured to operate in the active mode in response to the power received from the flow battery 104. The flow battery 104 may be directly or indirectly electrically connected to the thermal load 102. For example, although not shown, various embodiments may use power conversion equipment, conditioning equipment, and/or other devices between the flow battery 104 and the thermal load 102 for electrically connecting and supplying power from the flow battery 104 to the thermal load 102.

As mentioned, the flow battery 104 is configured to thermally manage the thermal load 102, in addition to supplying power to it. The flow battery 104 may thermally manage the thermal load 102 by controlling, influencing, and/or affecting its operating temperature, which is a temperature of the thermal load 102 when it is active or operating in the active mode. The flow battery 104 may do so by influencing or affecting a temperature of a fluid used to thermally regulate the thermal load 102. The fluid (which may also be referred to as a coolant or a cooling fluid), may pass through or sufficiently close enough to the thermal load 102 so that a temperature of the fluid affects or influences the operating temperature of the thermal load 102. The fluid may be in any of various types, forms or states, non-limiting examples of which include air, water, oil, electrolyte, or a refrigerant. Accordingly, the flow battery 104 thermally manages the thermal load 102 by influencing a temperature of the fluid that in turn influences the operating temperature of the thermal load 102.

In further detail, the flow battery 104 may thermally manage the thermal load 102 by controlling or influencing a temperature of the fluid to be below a temperature threshold and/or within a temperature range that, in turn, keeps an operating temperature of the thermal load 102 below the temperature threshold and/or within the temperature range. For at least some embodiments, the flow battery 104 cools or lowers a temperature of the fluid to be below the temperature threshold and/or within the temperature range. The flow battery 104 may do so by transferring heat from the fluid to the electrolyte.

In particular embodiments, such as shown in FIG. 1, the flow battery 104 transfers heat from the fluid to the electrolyte in at least one of the electrolyte tanks 108, 110. To do so, the flow battery 104 includes at least one heat exchanger 130 positioned or disposed within at least one of the electrolyte tanks 108, 110. The at least one heat exchanger 130 is configured to transfer heat from the fluid to the electrolyte, which in turn cools the fluid. In general, a heat exchanger is a device or apparatus configured to transfer heat between mediums (e.g., fluids), and/or from one medium (e.g., fluid) to another medium. One example of a heat exchanger is a tubular structure, such as in the form of a coil, that can transfer heat between fluid flowing within the tubular structure to fluid outside of or surrounding the tubular structure, although any other types of heat exchangers may be possible.

In the example embodiment shown in FIG. 1, the flow battery 104 is configured to thermally manage the load 102 by being configured to transfer heat from the fluid to both the anolyte in the anolyte tank 108 and the catholyte in the catholyte tank 110. Accordingly, the at least one heat exchanger 130 includes two heat exchangers, including a first heat exchanger 130(1) positioned in the anolyte tank 108 and configured to transfer heat from the fluid to the anaolyte in the anolyte tank 108, and a second heat exchanger 130(2) positioned in the catholyte tank 110 and configured to transfer heat from the fluid to the catholyte in the catholyte tank 110. In other embodiments, the flow battery 104 is configured to transfer heat in only one of the tanks 108, 110, and/or has a heat exchanger positioned in only one of the tanks 108, 110. Also, as described in further detail below, the flow battery 104, such as via at least one of the heat exchangers 130, is configured to cool the electrolyte (at least one of the anolyte or the catholyte) by transferring heat from the electrolyte to the fluid within at least one of the electrolyte tanks 108, 110, during various time periods of operation.

The temperature control system 106 is a device or apparatus configured to control (including regulate, influence, and/or affect) a temperature of the flow battery 104. In particular embodiments, the temperature control system 106 is configured to control or regulate a temperature of the electrolyte, including at least one of the anolyte or the catholyte, in at least one of the electrolyte tanks 108, 110. In the embodiment in FIG. 1, the temperature control system 106 is configured to control the temperature of both the anolyte in the anolyte tank 108 and the catholyte in the catholyte tank 110. In other embodiments, the temperature control system 106 is configured to control the temperature of only one of the anolyte or the catholyte in only one of the electrolyte tanks 108, 110.

Additionally, the temperature control system 106 may control or regulate the temperature of the electrolyte by providing or delivering the fluid to the flow battery 104, particularly to within at least one of the electrolyte tanks 108, 110 and/or to at least one of the heat exchangers 130. During various times periods, the temperature control system 106 may deliver the fluid at a temperature that is higher than a temperature of the electrolyte in the at least one electrolyte tank 108, 110, which may cause the at least one heat exchanger 130 to transfer heat from the fluid to the electrolyte in the at least one electrolyte tank 108, 110, heating the electrolyte. During other time periods, the temperature control system 106 may deliver the fluid at a temperature that is lower than a temperature of the electrolyte in the at least one electrolyte tank 108, 110, which may cause the at least one heat exchanger 130 to transfer heat from the electrolyte to the fluid in the at least one electrolyte tank 108, 110, cooling the electrolyte.

Further, in at least some embodiments, the functioning of the temperature control system 106, including how it controls the temperature of the electrolyte and/or whether it provides the fluid to the flow battery 104 at a temperature higher and/or lower than the electrolyte temperature, may be dependent on or responsive to the operation mode of the thermal load 102, such as whether the thermal load 102 is active (operating in the active mode) or inactive (operating in the inactive mode). In particular, the temperature control system 106 may be configured to cool the electrolyte (deliver the fluid at a temperature lower or cooler than the electrolyte temperature) in the at least one electrolyte tank 108, 110 in response to or dependent on the thermal load 102 being inactive. In addition or alternatively, the temperature control system 106 may be configured to heat the electrolyte (deliver the fluid at a temperature higher or hotter than the electrolyte temperature) in the at least one electrolyte tank 108, 110 in response to or dependent on the thermal load 102 being active.

In the embodiment in FIG. 1, the temperature control system 106 may receive the fluid from the thermal load 102, and deliver the fluid to the flow battery 104 in response to receipt of the fluid from the thermal load 102. Accordingly, the temperature of the fluid that the temperature control system 106 delivers to the flow battery 104 may depend on the temperature of the fluid that the thermal load 102 delivers to the temperature control system 106, which in turn may depend on the operating mode of the thermal load 102. For example, when the thermal load 102 is active, the thermal load 102 may deliver the fluid to the temperature control system 106 at a relatively high temperature, which in turn may cause the temperature control system 106 to deliver the fluid to the flow battery 104 at a temperature that is higher than the temperature of the electrolyte in the at least one electrolyte tank 108, 110, heating the electrolyte. In addition or alternatively, when the thermal load 102 is inactive, the thermal load 102 may deliver the fluid to the temperature control system 106 at a relatively cool temperature, which in turn may cause the temperature control system 106 to deliver the fluid to the flow battery 104 at a temperature that is cooler than the temperature of the electrolyte in the at least one electrolyte tank 108, 110, cooling the electrolyte.

The functioning of the temperature control system 106 to actively cool the electrolyte during and/or in response to the thermal load 102 being inactive may enhance or prolong the capability of the flow battery 104 as a thermal management or cooling device for the thermal load 102. For example, if the thermal load 102 otherwise delivered fluid directly to the at least one electrolyte tank 108, 110 without use of the temperature control system 106, the temperature of the electrolyte would eventually become too hot (i.e., reach too high of a level) that the electrolyte would no longer be able to effectively or sufficiently cool the fluid, and in turn, the flow battery 104 would no longer be able deliver the fluid to the thermal load 102 at a sufficiently low enough temperature to be an effective coolant for the thermal load 102. In contrast, by including the temperature control system 106, the system 100 leverages the inactive periods of the thermal load 102 so that the flow battery 104 can effectively function as a thermal management or cooling device for the thermal load 102 for longer periods of time.

In addition, use of both the temperature control system 106 and the flow battery 104 provides a two-step or two-stage cooling process of the heated fluid exiting the thermal load 102. That is, the temperature control system 106 may initially cool the fluid in a first stage, and then the flow battery 104 cools that initially-cooled fluid in a second stage. Use of the flow battery 104 to thermally manage the thermal load 104 may reduce the cooling required by the temperature control system 106 compared to if only the temperature control system 106 were used to thermally manage the thermal load 102. Offloading at least some of the cooling to the flow battery 104 in a two-stage cooling process may allow for a smaller sized temperature control system 106.

The system 100 in FIG. 1 may further include a circulation system 132 that is configured to communicate or circulate the fluid throughout the system 100 and fluidly couple the components of the system 100 with each other. Accordingly, such functionality of the circulation system 132 includes transferring, passing, and/or delivering the fluid, and/or allowing the fluid to flow, between the devices or system components of the system 100. For example, the circulation system 132 is configured to deliver the fluid from the thermal load 102 to the temperature control system 106, from the temperature control system 106 to the flow battery 104 (including to within the at least one electrolyte tank 108, 110 and/or to the at least one heat exchanger 130 disposed within the at least one electrolyte tank 108, 110), and from the flow battery 104 (including from the at least one electrolyte tank 108, 110 and/or the at least one heat exchanger 130 disposed within the at least one electrolyte tank 108, 110) to the thermal load 102. The circulation system 132 may include any of various kinds of structures that can deliver fluid from one point to another, such as pipes, tubes, and/or conduits, as non-limiting examples. For purposes of illustration, FIG. 1 appends arrows to the circulation system 132 to indicate the flow direction of the fluid being delivered in the circulation system 132 and/or through the system 100. In addition, in various embodiments, the circulation system 132 may include, or otherwise be fluidly coupled to, one or more pumps 134 configured to facilitate circulation of the fluid through the system 100.

Figure 2:
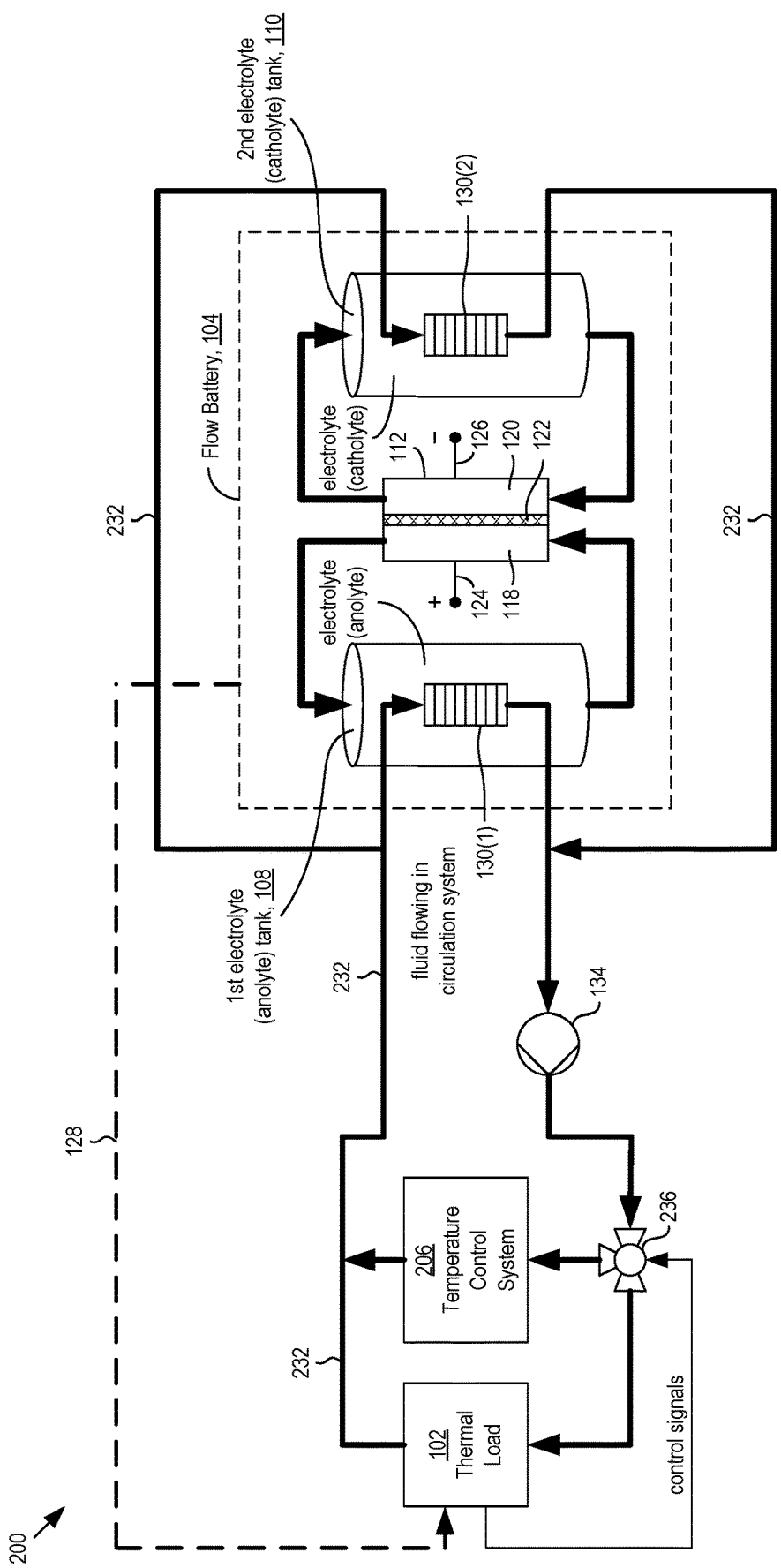
FIG. 2 shows a diagram of another example system configured to electrically power and thermally manage a thermal load.

FIG. 2 shows another example system 200 that uses a flow battery 104 as a thermal management or cooling device for a thermal load 102. The system 200 may be configured the same as or similar to the system 100 of FIG. 1, including that the system 200 has a temperature control system 206 configured to cool an electrolyte of the flow battery 104 in response to the thermal load 102 being inactive. However, instead of receiving the fluid from the thermal load 102 as in FIG. 1, the temperature control system 206 is connected in parallel with the thermal load 102, and a circulation system 232 is configured to bypass either the thermal load 102 or the temperature control system 206 when circulating the fluid. In particular, the circulation system 232 of FIG. 2 may deliver fluid to the thermal load 102 and bypass the temperature control system 206 in response to the thermal load 102 being active, and may deliver fluid to the temperature control system 206 and bypass the thermal load 102 in response to the thermal load 102 being inactive.

For at least some example embodiments, such as shown in FIG. 2, the circulation system 232 may include, or be fluidly coupled to, a valve 236, such as a three-way valve, that is configured to receive fluid from the flow battery 104, and selectively or alternatingly deliver the fluid to the thermal load 102 in response to the thermal load 102 being active or the temperature control system 206 in response to the thermal load 102 being inactive. In at least some embodiments, the valve 236 is electrically controllable, such as via one or more control signals, to selectively or alternatingly deliver the fluid to the thermal load 102 or the temperature control system 206. For example, in some embodiments, the thermal load 102 may include control circuitry configured to determine when the thermal load 102 is active or inactive, and output a control signal to the valve 236 to cause the valve 236 to deliver the fluid to the thermal load 102 or the temperature control system 206 based on the determination. In other embodiments, the control circuitry may be a separate component from the thermal load 102. In other embodiments, the valve 236 may be configured to selectively or alternatingly receive fluid from the thermal load 102 or the temperature control system 206.

Figure 3:
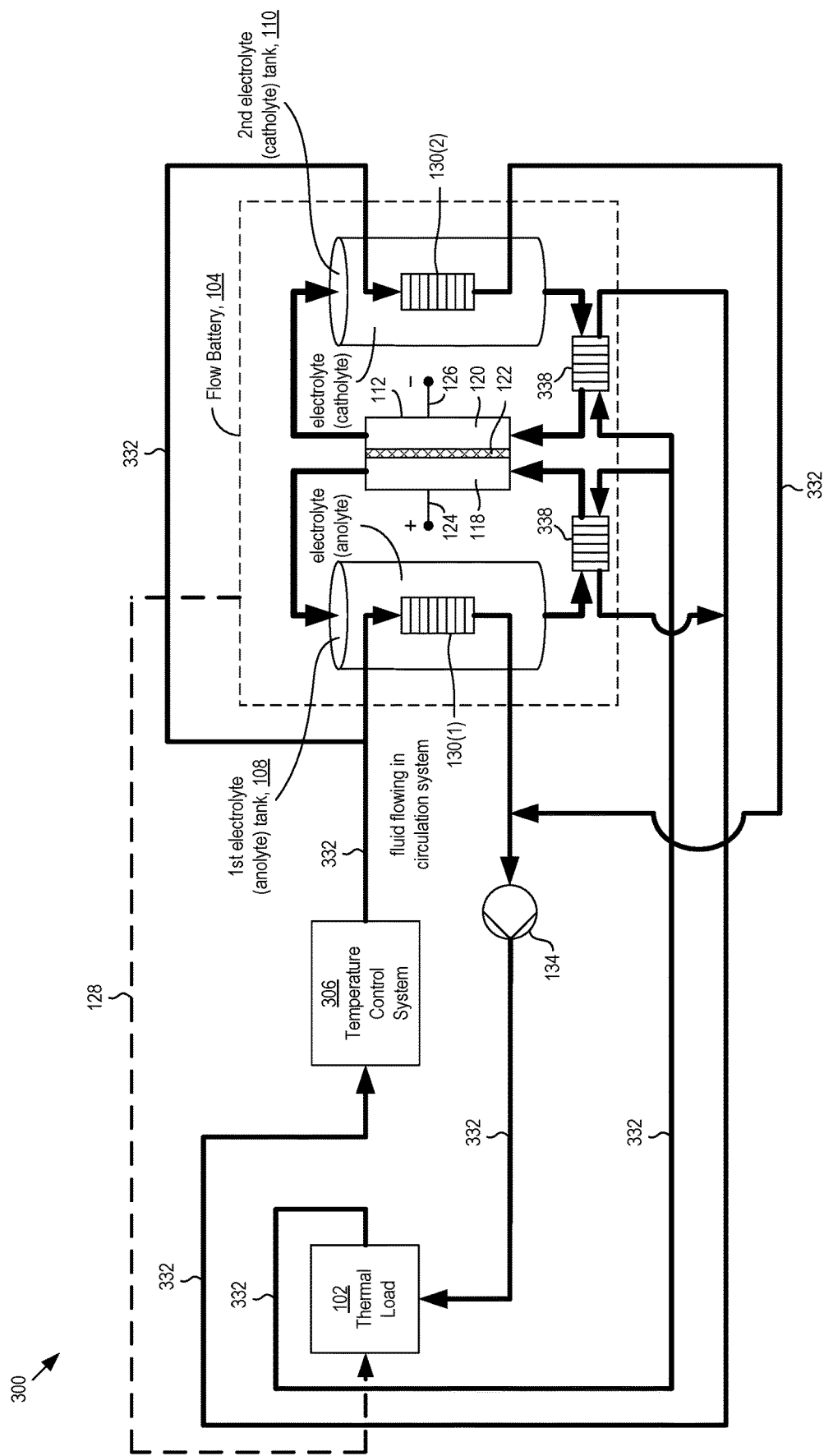
FIG. 3 shows a diagram of another example system configured to electrically power and thermally manage a thermal load.

FIG. 3 shows another example system 300 that uses a flow battery 104 as a thermal management or cooling device for a thermal load 102. The system 300 may be configured the same as or similar to the system 100 of FIG. 1, including that the system 300 has a temperature control system 306 configured to cool an electrolyte of the flow battery 104 in response to the thermal load 102 being inactive. However, instead of receiving the fluid from the thermal load 102 as in FIG. 1, the temperature control system 306 is configured to receive fluid from at least one heat exchanger 338 configured to exchange heat between the fluid and the electrolyte (including at least one of the anolyte or the catholyte) as the electrolyte is being delivered or flowing from the at least one electrolyte tank 108, 110 to the reactor 120. During at least periods when the thermal load 102 is active, the thermal load 102 may output the fluid at a temperature that is hotter than the temperature of the electrolyte being delivered from the electrolyte tanks 108, 110 to the reactor 120. In turn, the at least one heat exchanger 338 is configured to transfer heat from the fluid to the electrolyte, heating the electrolyte, which in turn can improve the efficiency of the flow battery 104. As shown in FIG. 3, a circulation system 332 may deliver the fluid from the at least one heat exchanger 338 to the temperature control system 306, which in turn delivers the fluid to the at least one electrolyte tank 108, 110.

In the embodiment in FIG. 3, multiple heat exchangers 338 are used to heat both the anolyte delivered from the anolyte tank 108 and the catholyte delivered from the catholyte tank 110. In other embodiments, the heat exchanger 338 heats only the anolyte or only the catholyte.

Figure 4:
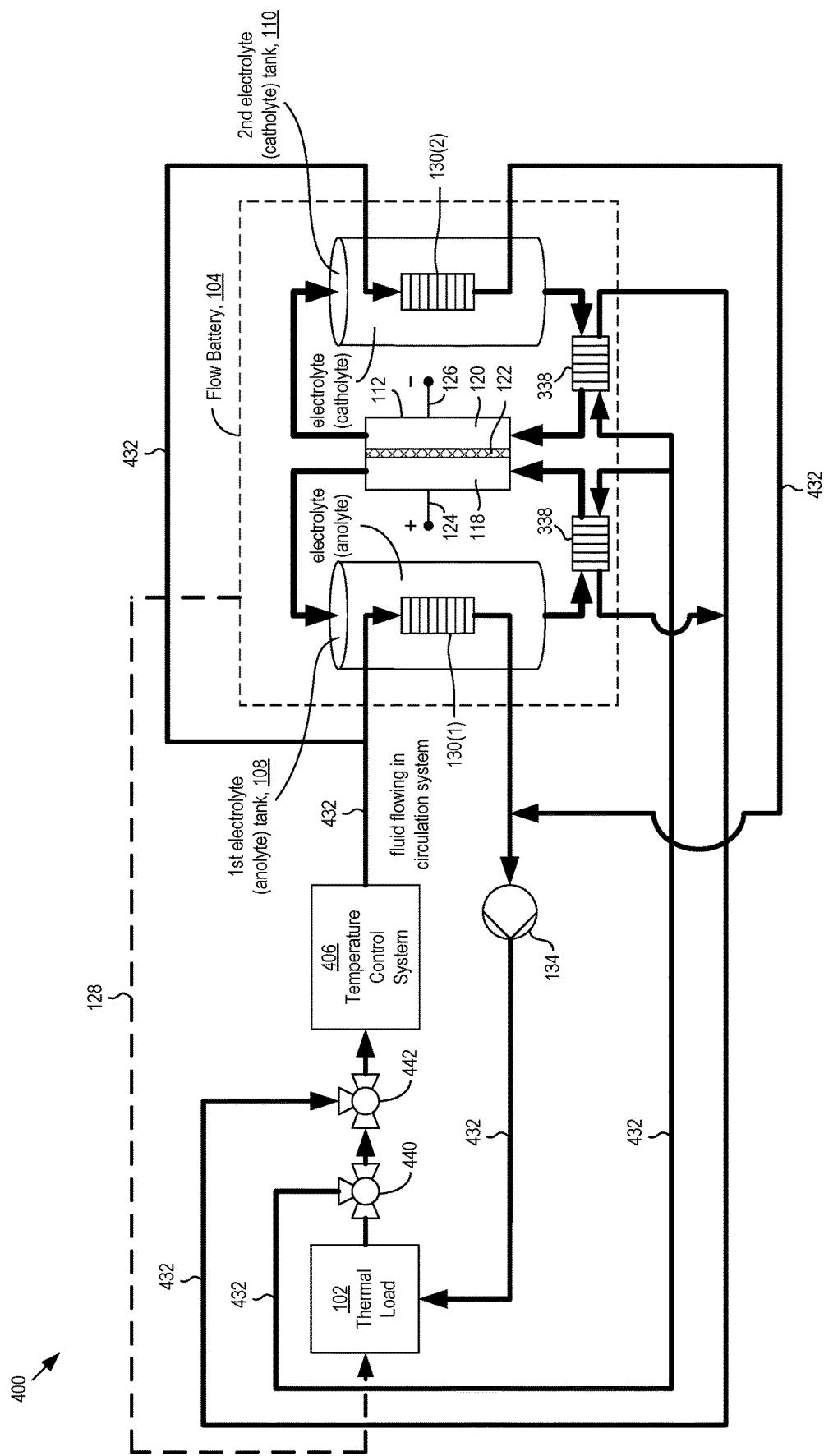
FIG. 4 shows a diagram of another example system configured to electrically power and thermally manage a thermal load.

FIG. 4 shows another example system 400 that uses a flow battery 104 as a thermal management for cooling device for a thermal load 102. The system 400 is similar to the system 300 in FIG. 3, except that the system 400 includes a first valve 440 and a second valve or other junction 442 positioned between the thermal load 102 and a temperature control system 406, and configured to selectively deliver fluid from the thermal load 102 to the heat exchangers 338 before delivering the fluid to a temperature control system 406. The first valve 440 may selectively deliver the fluid to the heat exchangers 338 based on whether the thermal load 102 is active or inactive. In particular, in response to the thermal load 102 being active, the first valve 440 may deliver the fluid to the heat exchangers 338, such as via a circulation system 432, and a second valve 440 may receive the fluid from the heat exchangers 338 and deliver the fluid to the temperature control system 406. Additionally, in response to the thermal load 102 being inactive, the first valve 440 may deliver the fluid to the second valve/junction 442, which may deliver the fluid to the temperature control system 406. In this way, the circulation system 432 and valves 440, 442 function to bypass the heat exchangers 338 in response to the thermal load 102 being inactive.

Figure 5:
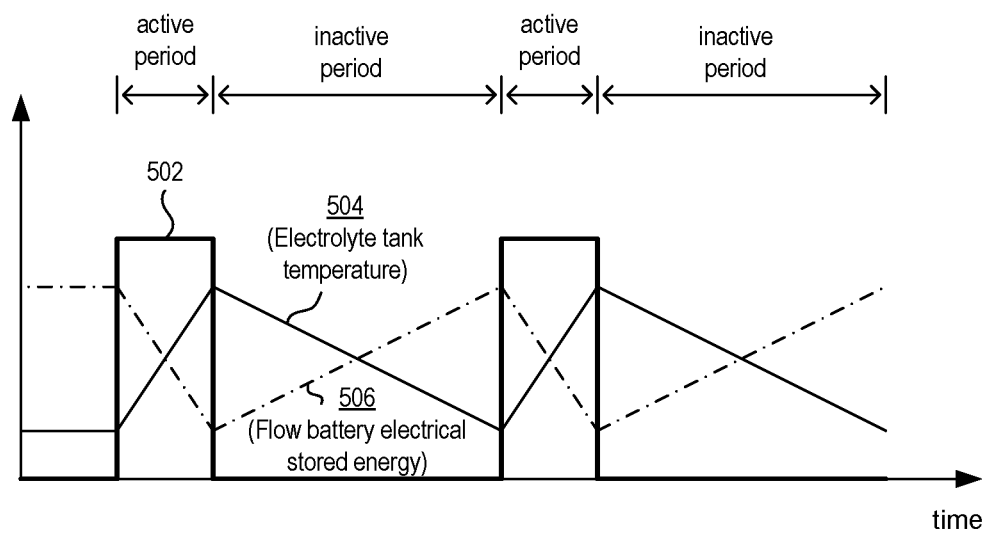
FIG. 5 shows a diagram of a relationship between a thermal load operating in active and inactive periods and electrical storage and temperature of a flow battery.

FIG. 5 shows a timing diagram illustrating an example temporal relationship between the thermal load 102 operating in active and inactive modes during active and inactive time periods, and electrolyte tank temperature and stored electrical energy in the flow battery 104. Curve 502 shows the thermal load 102 operating in pulsed active modes, where the active periods are much shorter than the inactive periods. Curve 504 shows an electrolyte temperature in at least one of the electrolyte tanks 108, 110 increasing (i.e., the electrolyte heating up) while the thermal load 102 is active, and decreasing (i.e., the electrolyte cooling down) while the thermal load 102 is inactive. Accordingly, curve 504 shows the temperature control system 106, 206, 306, 406 cooling the electrolyte in the electrolyte tanks 108, 110 in response to the thermal load 102 being inactive. Curve 506 shows electrical energy stored in the flow battery 104 decreasing (depleting) when the thermal load 102 is active, and increasing (recharging) when the thermal load 102 is inactive. Although not shown in FIGS. 1-4, in various embodiments, the flow battery 104 may be electrically coupled to a generator or other device configured to electrically charge the flow battery 104, including during the inactive periods.

The temperature control system 106, 206, 306, 406 may be implemented in any of various ways to function as a device or system that can cool the electrolyte in the at least one electrolyte tank 130, particularly when or in response to the thermal load 102 being inactive. In some embodiments, the temperature control system 106, 206, 306, 406 is configured as a heat exchanger that is configured to transfer heat from the fluid to another medium, such as air in the surrounding environment of the temperature control system 106, 206, 306, 406. By transferring heat from the fluid to the other medium, the temperature control system 106, 206, 306, 406 delivers fluid to the at least one electrolyte tank 130 at a temperature lower than the electrolyte temperature in the at least one tank 130, particularly during inactive periods of the thermal load 102, in turn cooling the electrolyte.

Figure 6:
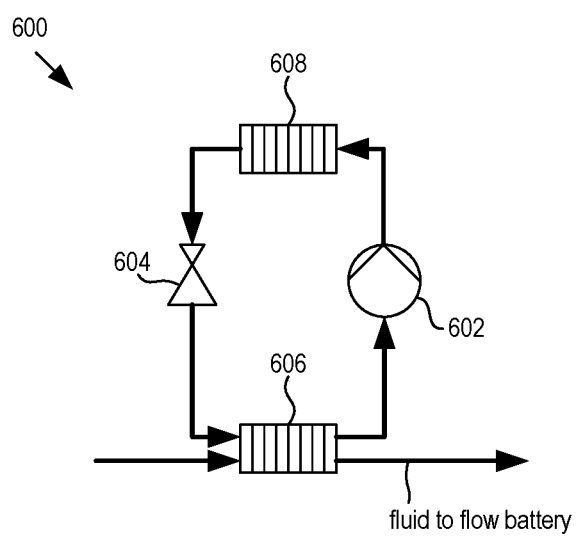
FIG. 6 shows a diagram of an example vapor cycle system.

In other embodiments, the temperature control system 106, 206, 306, 406 is implemented as a vapor cycle system. FIG. 6 shows an example configuration of a vapor cycle system 600, which may be representative of any of the temperature control systems 106, 206, 306, 406 in FIGS. 1-4, respectively. In general, the vapor cycle system 600 is a temperature control system that can cool the fluid to temperatures lower than an ambient or environment temperature. A vapor cycle system may be particularly useful in relatively hot environments, where it is desirable to cool the electrolyte in the at least one electrolyte tank 108, 110 to a temperature lower than an ambient or environmental temperature. In addition or alternatively, a vapor cycle system can increase a temperature difference between a temperature of the fluid exiting the thermal load 102 and the temperature of the fluid entering the flow battery 104 compared to a temperature difference between the temperature of the fluid exiting the thermal load 102 and the ambient or environmental temperature, which can effectively increase the cooling capability of the flow battery 104 or its capacity to remove heat from the thermal load 102.

In the example configuration shown in FIG. 6, the vapor cycle system 600 includes a compressor 602 and a valve 604 that circulate a second fluid between a pair of first and second heat exchangers 606, 608, with the second fluid entering the first heat exchanger 606 at a lower temperature than the first fluid used for thermally managing the thermal load 102. For at least some embodiments, the second fluid passing through the heat second heat exchanger 608 is at a temperature higher than the first fluid temperature, and drops to a temperature lower than the first fluid temperature upon passing through the valve 604. As shown in FIG. 6, the first fluid may pass through the first heat exchanger 606. Various other configurations of a vapor cycle system may be possible.

The following describes various embodiments of a method of operation for a system that uses a flow battery to thermally manage or cool a thermal load. The method may be performed using any of the systems 100, 200, 300, 400 of FIGS. 1-4, in accordance with the timing diagram in FIG. 5, and/or with the vapor cycle system 600 in FIG. 6. In various embodiments, the method includes operating a thermal load in an active mode during active time periods separated or interleaved by inactive time periods during which the thermal load is inactive. In various embodiments, the active periods are pulsed active periods, such that the active periods are shorter in duration than the inactive periods. The method may also include powering the thermal load during the active periods with a flow battery. During the active periods, stored electrical charge in the flow battery may decrease and temperature of electrolyte in one or electrolyte tanks of the flow battery may increase, in accordance with the timing diagram of FIG. 5. During the inactive periods, stored electrical charge in the flow battery may increase and the temperature of the electrolyte in the one or more electrolyte tanks may increase.

In addition or alternatively, in various embodiments, the method may include cooling fluid delivered to within at least one electrolyte tank of the flow battery. After cooling the fluid in the at least one electrolyte tank, a circulation system may deliver the cooled fluid to the thermal load, which may regulate an operating temperature of the thermal load, keep an operating temperature of the thermal load below a threshold level, and/or prevent the thermal load from overheating. In various methods, the fluid may be cooled within the at least one electrolyte tank and the cooled fluid may be delivered to the thermal load during active time periods while the thermal load is active. In addition or alternatively, in various embodiments, the method may include cooling the electrolyte with the fluid in response to the thermal load being inactive and/or during the inactive time periods. In various embodiments, the method includes a temperature control system delivering the fluid to at least one heat exchanger disposed within the least one electrolyte tank. The temperature of the fluid delivered from the temperature control system may be lower than a temperature of the electrolyte in the at least one electrolyte tank in response to the thermal load being inactive and/or during the inactive time periods, which may cool the electrolyte in the at least one electrolyte tank.

Various other methods that include any of the various functions, actions, or operations, or combinations thereof, performed by the components of the systems 100, 200, 300, 400, in accordance with the timing diagram in FIG. 5, and/or performed with the vapor cycle system 600, as previously described may be possible.

While various embodiments have been described, it will be apparent to those of ordinary skill in the art that many more embodiments and implementations are possible. Accordingly, the embodiments described herein are examples, not the only possible embodiments and implementations.

The subject matter of the disclosure may also include or relate to, among others, the following aspects:

A first aspect includes a system comprising:
a flow battery; and
a temperature control system configured to cool an electrolyte of the flow battery in response to a thermal load being inactive.

A second aspect includes the first aspect, and further includes that the temperature control system is configured to cool the electrolyte with a fluid that cools the thermal load when the thermal load is active.

A third aspect includes the first or second aspects, and further includes that the temperature control system is configured to deliver the fluid to a heat exchanger positioned in an electrolyte tank of the flow battery.

A fourth aspect includes any of the first through third aspects, and further includes a circulation system configured to circulate the fluid between the flow battery, the temperature control system, and the thermal load.

A fifth aspect includes the fourth aspect, and further includes that the circulation system is configured to deliver the fluid from the thermal load to the temperature control system.

A sixth aspect includes the fourth aspect, and further includes that the circulation system is configured to:
bypass the thermal load in response to the thermal load being inactive; and
bypass the temperature control system in response to the thermal load being active.

A seventh aspect includes any of the first through sixth aspects, and further includes that the temperature control system is configured to heat the electrolyte in response to the thermal load being active.

An eighth aspect includes any of the first through seventh aspects, and further includes that the temperature control system comprises a vapor cycle system.

A ninth aspect includes any of the first through eighth aspects, and further includes a heat exchanger configured to transfer heat from the fluid to the electrolyte when the electrolyte is flowing from an electrolyte tank to a reactor of the flow battery.

A tenth aspect includes the ninth aspect, and further includes a circulation system configured to deliver the fluid from the heat exchanger to the temperature control system.

An eleventh aspect includes the tenth aspect, and further includes that the circulation system is configured to bypass the heat exchanger in response to the thermal load being inactive.

A twelfth aspect includes any of the first through eleventh aspects, and further includes that the flow battery is configured to electrically power the thermal load.

A thirteenth aspect includes a system comprising:
a thermal load;
a flow battery configured to:
electrically power the thermal load; and
cool the thermal load with an electrolyte; and
a temperature control system configured to cool the electrolyte.

A fourteenth aspect includes the thirteenth aspect, and further includes that the flow battery is configured to cool a fluid with the electrolyte in order to cool the thermal load.

A fifteenth aspect includes the fourteenth aspect, and further includes that the temperature control system is configured to cool the fluid in order to cool the electrolyte in response to the thermal load being inactive.

A sixteenth aspect includes the fourteenth or fifteenth aspects, and further includes that the temperature control system is configured to deliver the fluid to a heat exchanger positioned in an electrolyte tank of the flow battery.

A seventeenth aspect includes the sixteenth aspect, and further includes that the heat exchanger comprises a first heat exchanger, and the thermal load is configured to deliver the fluid to a second heat exchanger configured to heat the electrolyte as it flows from the electrolyte tank to a reactor of the flow battery.

An eighteenth aspect includes a method comprising:
cooling, with an electrolyte in an electrolyte tank of a flow battery, a fluid delivered to within the electrolyte tank;
delivering, with a circulation system, the fluid from the electrolyte tank to a thermal load; and
cooling, with a temperature control system, the electrolyte in the electrolyte tank in response to the thermal load being inactive.

A nineteenth aspect includes the eighteenth aspect, and further includes: heating, with the fluid, the electrolyte flowing from the electrolyte tank to a reactor of the flow battery.

A twentieth aspect includes the eighteenth or nineteenth aspects, and further includes: operating the thermal load in pulsed active periods.

In addition to the features mentioned in each of the independent aspects enumerated above, some examples may show, alone or in combination, the optional features mentioned in the dependent aspects and/or as disclosed in the description above and shown in the figures.

What is claimed is:

1. A system comprising:
a flow battery;
a temperature control system configured to cool an electrolyte of the flow battery in response to a thermal load being inactive; and
a circulation system configured to circulate a fluid between the flow battery, the temperature control system, and the thermal load,
wherein the temperature control system is fluidly positioned in the circulation system downstream from the thermal load and upstream from the flow battery, such that the fluid, after passing through the thermal load, passes through the temperature control system before reaching the flow battery, and
wherein the temperature control system is configured to cool the fluid received from the thermal load when the thermal load is inactive and deliver the cooled fluid to the flow battery to cool the electrolyte without the use of an additional thermal storage device.

2. The system of claim 1, wherein the fluid cools the thermal load when the thermal load is active.

3. The system of claim 1, wherein the temperature control system is configured to deliver the fluid to a heat exchanger positioned in an electrolyte tank of the flow battery.

4. The system of claim 1, wherein the temperature control system is configured to heat the electrolyte in response to the thermal load being active.

5. The system of claim 1, wherein the temperature control system comprises a vapor cycle system.

6. The system of claim 1, further comprising a heat exchanger configured to transfer heat from the fluid to the electrolyte when the electrolyte is flowing from an electrolyte tank to a reactor of the flow battery.

7. The system of claim 6, wherein the circulation system is configured to deliver the fluid from the heat exchanger to the temperature control system.

8. The system of claim 7, wherein the circulation system is configured to bypass the heat exchanger in response to the thermal load being inactive.

9. The system of claim 1, wherein the flow battery is configured to electrically power the thermal load.

10. A system comprising:
a thermal load;
a flow battery configured to:
electrically power the thermal load; and
cool the thermal load with an electrolyte without the use of an additional thermal storage device;
a temperature control system configured to cool the electrolyte;
a first heat exchanger positioned in an electrolyte tank of the flow battery, the first heat exchanger configured to exchange heat between the electrolyte in the electrolyte tank and a liquid used to cool the thermal load; and a second heat exchanger positioned between the electrolyte tank and a reactor of the flow battery, the second heat exchanger configured to:
receive the fluid from the thermal load; and
heat the electrolyte with the fluid as the electrolyte flows from the electrolyte tank to the reactor.

11. The system of claim 10, wherein the flow battery is configured to cool the fluid with the electrolyte in order to cool the thermal load.

12. The system of claim 11, wherein the temperature control system is configured to cool the fluid in order to cool the electrolyte in response to the thermal load being inactive.

13. A system comprising:
a flow battery;
a temperature control system connected in parallel with a thermal load, the temperature control system configured to cool an electrolyte of the flow battery in response to a thermal load being inactive; and
a circulation system configured to:
circulate the fluid between the flow battery, the temperature control system, and the thermal load;
bypass the thermal load in response to the thermal load being inactive; and
bypass the temperature control system in response to the thermal load being active, wherein the circulation system does not include a bypass valve configured to bypass the flow battery.

* * * * *